(12) United States Patent
Nelson

(10) Patent No.: US 10,893,671 B1
(45) Date of Patent: Jan. 19, 2021

(54) DEVICE AND SYSTEM FOR RODENT CONTROL AND EXTERMINATION

(71) Applicant: Jon D. Nelson, Plano, TX (US)

(72) Inventor: Jon D. Nelson, Plano, TX (US)

(*) Notice: Subject to any disclaimer, the term of this patent is extended or adjusted under 35 U.S.C. 154(b) by 0 days.

(21) Appl. No.: 16/806,683

(22) Filed: Mar. 2, 2020

(51) Int. Cl.
*A01M 23/38* (2006.01)
*A01M 23/02* (2006.01)

(52) U.S. Cl.
CPC ............ *A01M 23/38* (2013.01); *A01M 23/02* (2013.01); *A01M 2200/00* (2013.01)

(58) Field of Classification Search
CPC ............ A01M 1/06; A01M 1/10; A01M 1/12; A01M 23/00; A01M 23/02; A01M 23/14; A01M 23/38; A01M 2200/00
USPC ................................. 43/58, 98, 99, 112, 139
See application file for complete search history.

(56) References Cited

U.S. PATENT DOCUMENTS

| | | | | |
|---|---|---|---|---|
| 4,566,218 A | * | 1/1986 | Kurosawa | A01M 23/18 43/58 |
| 4,653,221 A | * | 3/1987 | Pratscher | A01M 23/14 43/64 |
| 4,780,985 A | * | 11/1988 | Coots | A01M 23/38 43/98 |
| 4,965,959 A | * | 10/1990 | Gagne | A01M 1/06 43/58 |
| 5,040,326 A | * | 8/1991 | Van Dijnsen | A01M 23/02 43/139 |
| 5,222,322 A | | 6/1993 | Mastromonaco | |
| 5,452,539 A | * | 9/1995 | Kurosawa | A01M 23/02 43/58 |

(Continued)

FOREIGN PATENT DOCUMENTS

| | | |
|---|---|---|
| IN | 2017/21041551 A | 12/2017 |
| WO | WO 2017/131570 A1 | 8/2017 |

OTHER PUBLICATIONS

Amazon.com: Victor Electronic Mouse Trap—No touch, No see disposal—M2524 : Rodent Traps : Garden & Outdoor [online] [retrieved Apr. 1, 2020]. Retrieved via the Internet: web.archive.org/web/20180817184818/https://www.amazon.com/Victor-Electronic-Mouse-Trap-disposal/dp/B000E1RIUU (dated Aug. 17, 2018) 9 pages.

(Continued)

*Primary Examiner* — Darren W Ark
*Assistant Examiner* — Brady W Frazier
(74) *Attorney, Agent, or Firm* — Alston & Bird LLP

(57) ABSTRACT

Systems, devices, and associated methods of manufacturing are described that provide a rodent extermination system for efficient rodent population control. An example rodent extermination system includes a vacuum unit configured to generate suction and an extermination chamber. The extermination chamber defines a first end attached to and in fluid communication with the vacuum unit and a second end in fluid communication with an external environment. The system also includes at least one presence sensor and at least two electrocution plates. The at least two electrocution plates are electrified such that the rodent is electrocuted via contact with the electrocution plates, and the vacuum unit generates suction such that the rodent is moved through the extermination chamber. The vacuum unit may comprise a kill plate into which the rodent is ejected at high velocity in order to induce cervical dislocation or blunt force trauma to the rodent.

20 Claims, 7 Drawing Sheets

(56) References Cited

U.S. PATENT DOCUMENTS

| | | | |
|---|---|---|---|
| 5,915,950 A | 6/1999 | Kleinhenz | |
| 5,926,997 A * | 7/1999 | Wilcox | A01M 1/026 |
| | | | 43/121 |
| 5,953,853 A * | 9/1999 | Kim | A01M 23/38 |
| | | | 43/61 |
| 6,202,343 B1 | 3/2001 | Mah | |
| 6,865,843 B1 * | 3/2005 | Jordan, Sr. | A01M 23/12 |
| | | | 43/139 |
| 7,530,195 B2 | 5/2009 | Muller et al. | |
| 8,701,338 B1 * | 4/2014 | Walsh, Jr. | A01M 31/002 |
| | | | 43/139 |
| 8,701,339 B1 * | 4/2014 | Walsh | A01M 31/002 |
| | | | 43/139 |
| 10,070,642 B2 | 9/2018 | Lubic et al. | |
| 2006/0123693 A1 * | 6/2006 | Muller | A01M 23/38 |
| | | | 43/99 |
| 2012/0285075 A1 * | 11/2012 | Lubic | A01M 23/08 |
| | | | 43/60 |
| 2015/0020436 A1 * | 1/2015 | James | A01M 23/14 |
| | | | 43/58 |

OTHER PUBLICATIONS

Ratvac—The Best Rodent Trap EVER!—YouTube [online] [retrieved Apr. 1, 2020]. Retrieved via the Internet: https://www.youtube.com/watch?v=9yYTixLbySw (dated Feb. 3, 2015) 3 pages.

Suck Up Mice With The Automatic Infared Vacuum Moustrap. DIY Project-Mousetra . . . [online] [retrieved Apr. 1, 2020]. Retrieved via the Internet: https://www.youtube.com/watch?v=fJKdEL9XNg (dated Dec. 20, 2018) 3 pages.

* cited by examiner

DEVICE AND SYSTEM FOR RODENT CONTROL AND EXTERMINATION

TECHNOLOGICAL FIELD

Example embodiments of the present invention relate generally to pest control and, more particularly, to a system for efficient and humane elimination of nuisance rodent populations.

BACKGROUND

Rodents (e.g., rats, mice, etc.) are common pests and nuisances that may transmit various diseases, inflict property damage, and the like. Furthermore, rodent populations continue to expand, particularly in major metropolitan areas, due to the availability of food and shelter in many locations. Through applied effort, ingenuity, and innovation, some of the problems associated with conventional rodent population control have been minimized by developing solutions that may be included in embodiments of the present invention, many examples of which are described in detail herein.

BRIEF SUMMARY

Accordingly, the systems and methods described herein provide a rodent extermination device and system for controlling rodent populations in an efficient and effective manner without the use of toxicants.

As described above, rodents (e.g., rats and mice, as well as squirrels, chipmunks, etc.) are pests that may transmit various diseases, inflict property damage, and cause many other problems. As such, essentially all residences and commercial locations, such as restaurants, warehouses, food storage and production facilities, animal feed mills, etc., desire to reduce or eliminate rodent populations to prevent these harmful effects. Some conventional attempts at controlling rodent populations (e.g., traps) rely on the use of toxicants (e.g., pesticides, rodenticides, repellants, and the like) that are toxic when contacted or ingested by a rodent. The toxicants used by these conventional methods, however, may be dangerous to humans (e.g., resulting in undesirable effects when handled by humans), pets (e.g., dogs, cats, hamsters, rabbits, etc.), and/or the environment. Furthermore, toxicant-based rodent traps typically require a user to physically remove a rodent carcass from the trap. Additionally, some high risk or sensitive locations (e.g., food service locations, hospitals, or the like) may operate according to regulations that prohibit the use of toxicant-based traps.

Other conventional attempts at controlling rodent populations rely on mechanical traps. These attempts, however, are often inefficient, requiring consistent monitoring and/or removal of deceased rodents. Furthermore, many mechanical traps merely serve to contain (e.g., trap, enclose, etc.) a rodent and provide no means of execution. In doing so, traditional mechanical traps require a user to remove a trapped rodent manually and, in some instances, to manually handle execution the trapped rodent. Additionally, various mechanical traps that provide execution do so in a manner that is inhumane to the rodent, often by drowning or asphyxiation.

As such, embodiments described herein provide for a rodent extermination system that humanely and efficiently exterminates rodents on a large-scale basis and without requiring continuous human monitoring or intervention.

As described herein according to some embodiments, the rodent extermination system may identify a rodent entering an extermination chamber, electrify electrocution plates to humanely exterminate the rodent, and cause suction to be generated by a vacuum unit in fluid communication with the extermination chamber to move the rodent through the system. The rodent extermination system may further provide a collection receptacle that receives the electrocuted rodents to prevent human contact with the deceased rodents.

The rodent extermination system further employs a humane method of elimination and provides for disposal of rodent carcasses in a sanitary manner without human contact. An example rodent extermination system is provided that includes a vacuum unit configured to generate suction. The rodent extermination system may further include an extermination chamber defining a first end attached to and in fluid communication with the vacuum unit and a second end in fluid communication with an external environment. The extermination chamber may further include at least one presence sensor positioned in the extermination chamber and at least two electrocution plates positioned in the extermination chamber. In an instance in which the at least one presence sensor detects a rodent within the extermination chamber, the at least two electrocution plates may be electrified such that the rodent may be electrocuted via contact with the at least two electrocution plates and the vacuum unit may generate suction such that the rodent is moved through the extermination chamber from the second end to the first end.

In some embodiments, the vacuum unit may include a collection receptacle configured to receive the rodent exiting the extermination chamber at the first end. In an instance in which the at least one presence sensor detects the rodent within the extermination chamber, the electrocution plate may be electrified for a first time period, and the vacuum unit may generate suction for a second time period. In some embodiments, the extermination chamber further defines an attractant station configured to store a rodent attractant. In some embodiments, the at least one presence sensor is positioned between the attractant station and the second end. In some embodiments, the vacuum unit comprises a kill plate unit configured such that the rodent exiting the extermination chamber at the first end collides with the kill plate unit.

An example rodent extermination device is also provided that may include an extermination chamber defining a first end configured to receive a vacuum source connected thereto and a second end in fluid communication with an external environment. The rodent extermination device may define at least one presence sensor positioned in the extermination chamber and at least two electrocution plates positioned in the extermination chamber. In an instance in which the at least one sensor detects a rodent within the extermination chamber, the at least two electrocution plates may be electrified such that the rodent is electrocuted and, via application of suction at the first end, the rodent may be moved through the system.

In some embodiments, in an instance in which the at least one presence sensor detects the rodent within the extermination chamber, the electrocution plate may be electrified for a first time period. In some embodiments, the rodent extermination device may further define an attractant station configured to store a rodent attractant. In some embodiments, the at least one presence sensor may be positioned between the attractant station and the second end. In some embodiments, the extermination chamber may be configured to be removably attached to a vacuum unit via the first end.

An example method of manufacturing a rodent extermination system is provided. The method may include providing a vacuum unit configured to generate suction. The method may further include providing an extermination chamber that defines a first end attached to and in fluid communication with the vacuum unit and a second end in fluid communication with an external environment. The method may further include positioning at least one presence sensor in the extermination chamber and positioning at least two electrocution plates in the extermination chamber. In an instance in which the at least one presence sensor detects a rodent within the extermination chamber, the at least two electrocution plates may be electrified such that the rodent is electrocuted via contact with the at least two electrocution plates and the vacuum unit may generate suction such that the electrocuted rodent is moved through the extermination chamber from the second end to the first end.

In some embodiments, the method of manufacturing may also include providing a collection receptacle configured to receive the rodent exiting the extermination chamber at the first end. In some embodiments, in an instance in which the at least one presence sensor detects the rodent within the extermination chamber, the electrocution plate may be electrified for a first time period and the vacuum unit may generate suction for a second time period. In some embodiments, the method may also include providing an attractant station in the extermination chamber configured to store a rodent attractant. In some embodiments, the at least one presence sensor may be positioned between the attractant station and the second end. In some embodiments, the extermination chamber may be removably attached to the vacuum unit via the first end.

BRIEF DESCRIPTION OF THE DRAWINGS

Having described certain example embodiments of the present disclosure in general terms above, reference will now be made to the accompanying drawings. The components illustrated in the figures may or may not be present in certain embodiments described herein. Some embodiments may include fewer (or more) components than those shown in the figures.

DETAILED DESCRIPTION

Overview

Figure 1:
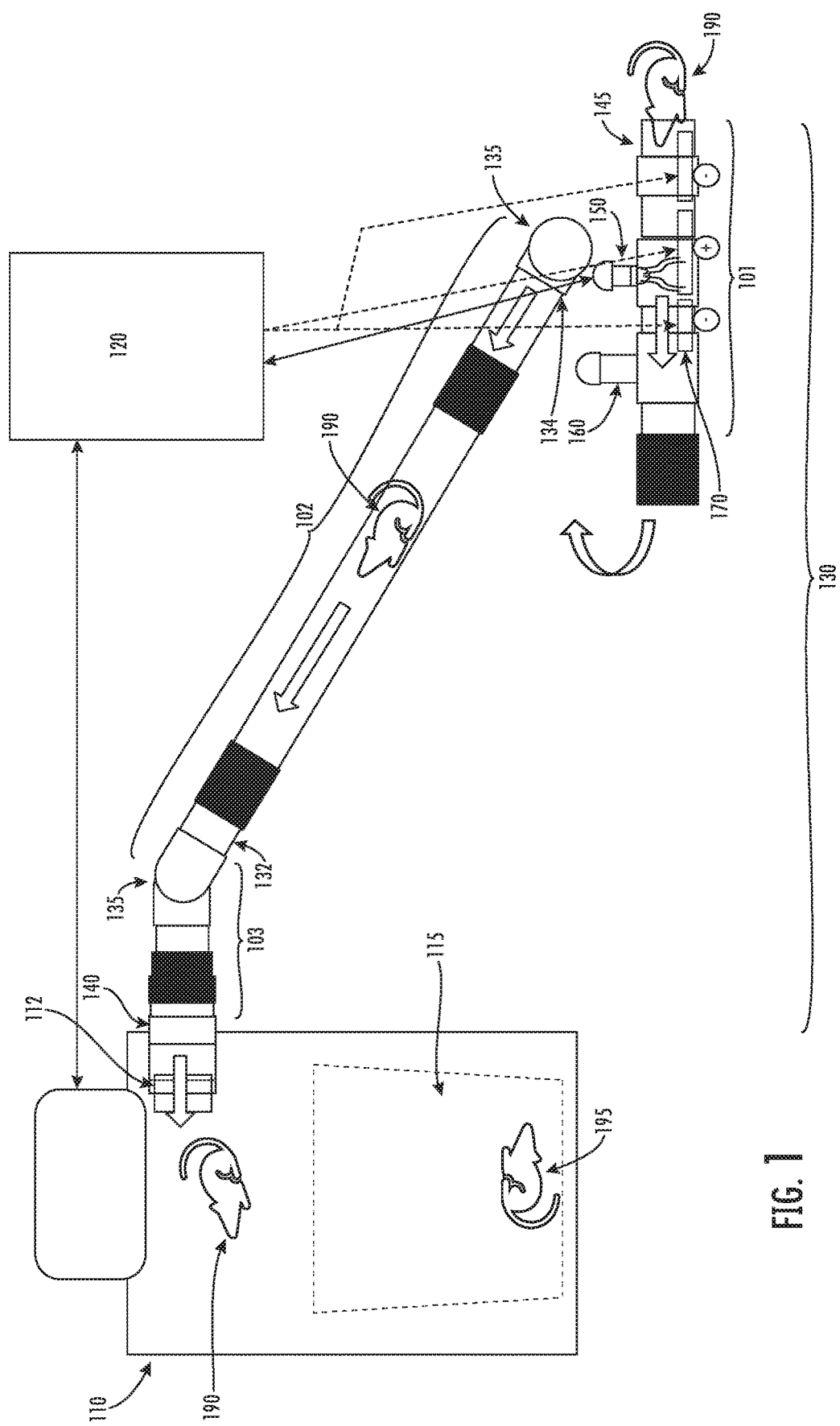
FIG. 1 is a perspective view of a rodent control and extermination system according to an example embodiment.

The present invention now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Additionally, as used herein, the term "circuitry" refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of "circuitry" applies to all uses of this term herein, including in any claims. As a further example, as used herein, the term "circuitry" also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device (such as a core network apparatus), field programmable gate array, and/or other computing device.

Device and System for Rodent Control and Extermination

With reference to FIGS. 1-5B, embodiments of a rodent extermination system are illustrated. Embodiments of the system represent an improvement over conventional systems for many reasons.

As an example, a primary advantage of the system is that it can easily be broken down into four (4) sections or sub-systems for easy assembly, disassembly, cleaning and/or storage. The sections may include an Entry Tube, an Acceleration Tube, a Sanitary Collection Container Exit Tube and Kill Plate, and a Sanitary Collection Container.

According to some embodiments, the Entry Tube may contain the electrocution plates, a sensor tube, and an attractant tube. The electrocution plates may include, for example, three plates, where one plate provides a positive DC current and the other two plates act as negative grounds. Passage of the current through the rodent when the rodent makes contact with the plates, as described below, is configured to exterminate the rodent.

The Acceleration Tube may be a tube that is configured to allow the rodent passing through to have the speed of its passage through the tube accelerated prior to entering the Sanitary Collection Container. In one embodiment, for example, the tube is 30 inches long and allows for acceleration of the rodent to a speed of approximately 25 to 35 feet per second prior to entering the Sanitary Collection Container.

As described in greater detail below with reference to the figures, a Kill Plate is attached to the end of this tube. The Kill Plate causes cervical dislocation and/or blunt force trauma to the rodent being ejected from the Acceleration Tube into the Collection Container at a high velocity (e.g., approximately 25 to 35 feet per second). In this way, a "second kill" mechanism is provided to confirm that the rodent is dead, in the event that application of the current via the plates did not serve to kill the rodent.

The Sanitary Collection Container includes a collection bag configured to receive the dead rodent after impact with the Kill Plate. The Collection Container is configured to be easily separated from the Exit Tube in order to remove the bag and replace it without the user needing to contact the dead rodents. In an example embodiment, the system may be configured as a 3-inch tube system that uses a 20-gallon container. In another example, the system may be a 2.5-inch tube system that uses a 16-gallon container. In yet another example, the system may be a 2-inch system that uses an 8-gallon container. The size of the system may be selected by the user based on the location where the system will be used, the size of the rodent population, the particular type of rodent to be exterminated, and other considerations.

As such, the four sections described above may be configured in different-sized tube systems, such as a 2-inch diameter tube system or smaller, a 2.5-inch diameter tube system, and a 3-inch diameter tube system or larger. These sized tube systems may be connected to vacuum units of various sizes to obtain adequate suction for accelerating the rodent through the Acceleration Tube. For example, in some embodiments, a 3-inch diameter tube system may be connected to vacuum units moving 300 CFM (cubic feet per minute) of air; a 2.5-inch diameter tube system may be connected to a vacuum system moving 140 CFM of air; and a 2-inch diameter tube system may be connected to a vacuum system moving 80 CFM of air, respectively. As such, the size of the tube may be configured to regulate the size of the rodent entering the Entry Tube. The flow rate of air moved by the vacuum system may thus be matched to the size of the tube and, as a result, the size of the rodent to help ensure that the velocity of the rodent is adequate to result in an effective kill by the Kill Plate.

As such, and as described in greater detail below, embodiments of the present invention provide a system for exterminating rodents that includes two "kill" mechanisms. These mechanisms may be used concurrently, independently, or separately. Said differently, embodiments of the system may allow a user to turn off the DC current to the electrocution plates and depend solely on the Kill Plate (e.g., blunt force impact) for an effective, efficient, and humane kill of the rodent. In still other embodiments, the system may be designed and built to include only the Kill Plate, thereby eliminating the electrocution plates from the system if desired. This configuration would allow for the construction of a reduced-priced unit that is only dependent on the operation of the vacuum system for an efficient and humane kill. In embodiments of the system in which the electrocution plates are omitted, a simpler Control Unit may be used, also contributing to a lower cost and price of the system and thereby allowing such units to be within the financial reach of households and for use in other areas of minor infestation.

Blocking boards may be used in connection with the system described herein, when appropriate. A blocking board may consist of a board in which a hole has been drilled matching the outside circumference of the Entry Tube of the system in use. The Entry Tube may be placed in or through the hole near a lower corner. The board may then be placed against a well-traveled wall such that the rodent's free movement down the wall is obstructed, and the rodent is caused to either circumvent the board or enter the tube, most likely resulting in the rodent entering the tube as the easiest course of action.

Turning now to FIG. 1, embodiments of the rodent extermination system will be described in greater detail. As shown, the rodent extermination system may include an extermination chamber 130 operably coupled to (e.g., in fluid communication with) a vacuum unit 110. The extermination chamber 130, as described above and discussed in more detail below, may include the Entry Tube 101, the Acceleration Tube 102, and the Exit Tube 103. It should be understood by one skilled in the art in light of this disclosure that the term "tube" as used herein refers to a section that may be configured in different cross-sectional shapes and sizes. Thus, although depicted and described as "Tubes" having a circular cross-section for ease of explanation, it is contemplated that in other embodiments the cross-section may be square, rectangular, oblong, or otherwise shaped, in accordance with user preferences and/or other parameters of the system.

The extermination chamber 130 may define a first end 140 (e.g., as part of the Exit Tube 103) that, in some embodiments, is attached to and in fluid communication with the vacuum unit 110. In such an embodiment, the rodent extermination system may be formed as a single, integral unit (e.g., the vacuum unit 110 secured to the extermination chamber 130). In other embodiments, however, the extermination chamber 130 may be formed separate from the vacuum unit 110 and the first end 140 may be configured to be removably attached to the vacuum unit 110 or may be formed as a separate modular component. Said differently, the extermination chamber 130 may, via the first end 140, be configured to receive a vacuum source connected thereto (e.g., a vacuum unit 110 or the like).

With continued reference to FIG. 1, the extermination chamber 130 may further define a second end 145. As shown, the second end 145 may be part of the Entry Tube 101 and may be located opposite the first end 140. The second end 145 may be in fluid communication with an external environment of the rodent extermination system. As described further herein with reference to operation of the rodent extermination system, the extermination chamber 130 may be formed as one or more channels, tubes, or similar structures through which air may flow. As shown in FIG. 1, the extermination chamber 130 may, in some embodiments define one or more cylindrical tubes (e.g., having circular cross-sections) extending between the first end 140 and the second end 145. In this way, the extermination chamber 130 may be configured to allow a rodent received by the extermination chamber 130 via the second end 145 of the Entry Tube 101 to move (e.g., walk) through the extermination chamber 130 (e.g., from the second end 145 towards the first end 140). In this regard, the second end 145 may operate as an entrance into the extermination chamber 130 for a rodent 190. Although described herein with reference to an external environment, the present disclosure contemplates that the external environment may refer to any position located outside of the extermination chamber 130. Said differently, the second end 145 may be positioned within a housing or other enclosure configured to surround and/or contain all or parts of the extermination system (e.g., for aesthetic purposes), such that the external environment of the extermination chamber 130 may refer to a position within such enclosure.

In some embodiments, the extermination chamber 130 may be formed as a single tubular structure (e.g., a straight tube). In other embodiments, the extermination chamber 130 may be formed as two or more tubular sections as illustrated in FIG. 1. By way of example, the extermination chamber 130 may include two junctions 135 (e.g., elbows, bends, flexible connectors, etc.) that may serve to connect the Entry Tube 101, the Acceleration Tube 102, and the Exit Tube 103 of the extermination chamber 130. Each section 101, 102, 103 of the extermination chamber 130 as well as junctions 135 may be formed using any suitable material including synthetic plastic polymers (e.g., polyvinyl chloride (PVC) piping), flexible synthetic rubbers, alloys, metals, ceramics, or the like. Although illustrated in FIG. 1 with three (3) sections or tubes (e.g., 101, 102, and 103), the present disclosure contemplates that any number of sections or tubes may be used based upon the intended application of the extermination chamber 130. In such embodiments, the system is designed to be accessible to the user, such that in the event a rodent becomes trapped in one of the sections or tubes 101, 102, 103; part of the system (e.g., an electrocution plate) needs to be cleaned or replaced; an upgrade is made to any portion of the system; and/or one or more of the sections or tubes is to be cleaned or sterilized, the user can easily disassemble and reassemble the system.

As noted above, the extermination chamber 130 may vary in size based upon the intended application of the rodent extermination system. For example, an extermination chamber 130 having a diameter of approximately three (3) inches may be suitable for a rodent infestation that includes large rodents. As another example, an extermination chamber 130 having a diameter of two (2) inches may be suitable for a rodent infestation that includes small rodents such as mice or small rats. As would be evident to one of ordinary skill in the art in light of the present disclosure, the extermination chamber 130 may be configured in any suitable diameter (e.g., one and a half (1.5) inches, two (2) inches, two and a half (2.5) inches, three (3) inches, four (4) inches, etc.) to accommodate rodents of any size. As an example, a rat or mouse uses it whiskers to determine if it will fit in a hole prior to entering. As such, each size of tube therefore restricts the size of the rodent that may enter, thus helping to ensure that the rodent will not plug the system.

Figure 2:
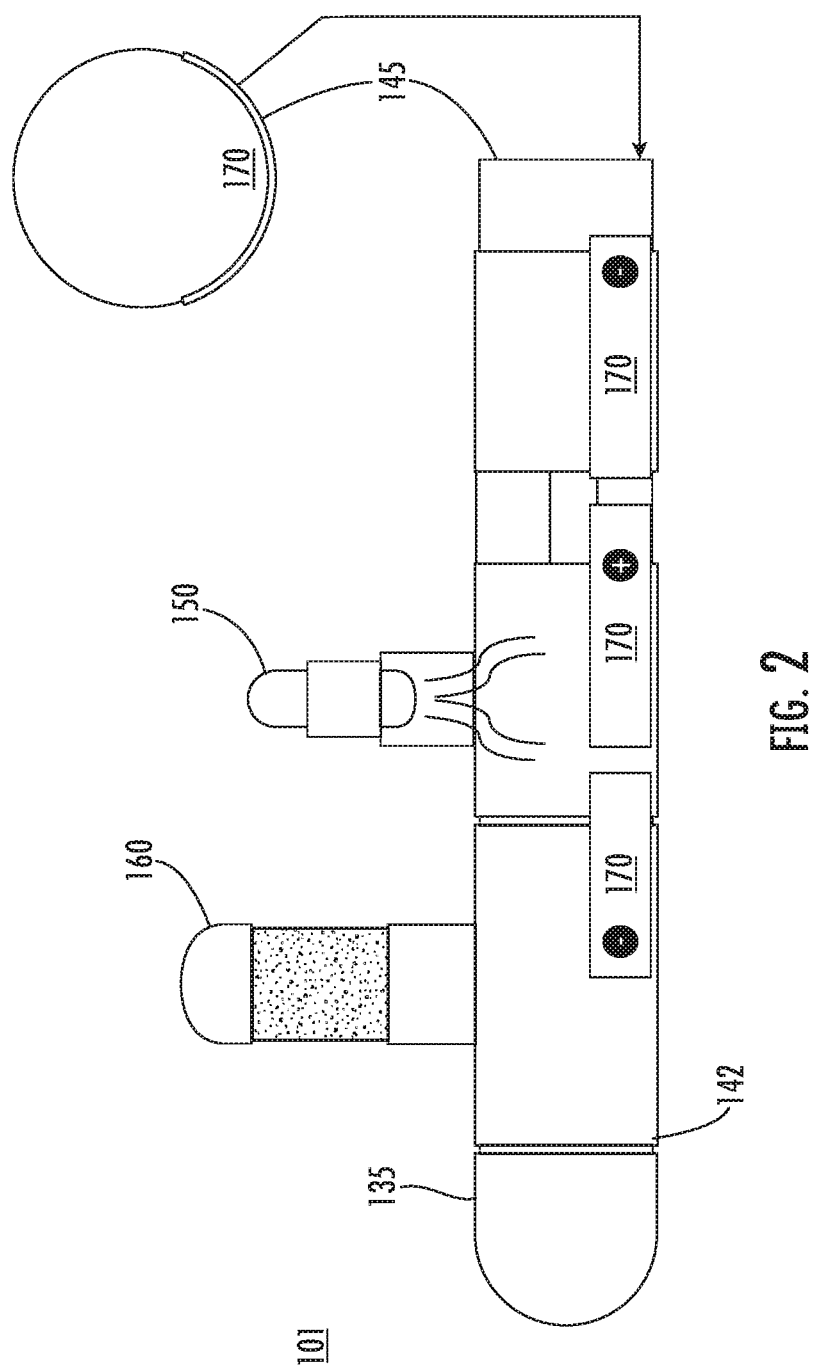
FIG. 2 is a perspective view of an example entry tube of the extermination chamber of FIG. 1.

With reference to FIG. 2, an Entry Tube 101 of the extermination chamber 130 configuration depicted in FIG. 1 is illustrated. The Entry Tube 101 may include the second end 145 and a third end 142 opposite the second end 145. The third end 142 may be configured to be attached or otherwise in fluid communication with the Acceleration Tube 102 via a junction 135. As described above with reference to FIG. 1, the second end 145 may be in fluid communication with an external environment and may operate as a point of entry for the rodent 190. Although described herein with reference to a single rodent as an example and for ease of explanation, the rodent extermination system of the present disclosure contemplates and is designed for receiving any number of rodents of varying size and shape, either intermittently or successively. In some embodiments, the extermination chamber 130 may be dimensioned (e.g., sized and shaped) such that multiple rodents may be received simultaneously. Said differently, the Entry Tube 101, the Acceleration Tube 102, and the Exit Tube 103 may be configured so as to accommodate and exterminate multiple rodents at the same time.

In some embodiments, the Entry Tube 101 may include at least one presence sensor 150. The sensor 150 may be a motion sensor, pressure sensor, contact switch, and/or the like. Regardless of the type of sensor, the presence sensor 150 may be configured to detect the presence of a rodent 190 within the extermination chamber 130 (e.g., entering the Entry Tube 101 via the second end 145). For example, the rodent may enter the Entry Tube 130 via the second end 145, and the at least one presence sensor 150 may detect the presence of the rodent 190 as the rodent 190 enters a proximity of the presence sensor(s) 150. In some embodiments, the at least one presence sensor 150 may be positioned within the extermination chamber 130 such that the at least one presence sensor may be physically contacted by the rodent (e.g., in embodiments in which the sensor is a pressure switch). In other embodiments, at least a portion of the presence sensor 150 may be positioned within the extermination chamber 130 (e.g., one or more electrodes associated with the presence sensor 150) while another portion of the presence sensor 150 (e.g., associated processor, memory, or the like) may be positioned separate from the extermination chamber 130. In other embodiments, the presence sensor 150 may be positioned separate from the extermination chamber 130 and may be configured to project, for example, a light beam into the extermination chamber 130 to detect the presence of the rodent 190 within the extermination chamber 130.

With continued reference to FIG. 2, the Entry Tube 101 of the extermination chamber 130 may, in some embodiments, include an attractant station 160. As would be evident to one of ordinary skill in the art in light of the present disclosure, rodents may, in some instances, enter the Entry Tube 101 via the second end 145 of their own accord, curiosity, or the like. In some embodiments, however, the Entry Tube 101 may include the attractant station 160 configured to entice the rodent 190 to enter the rodent extermination system. The attractant station 160 may be configured to contain or store a rodent attractant (e.g., a commercial rodent attractant, a liquid attractant soaked into a sponge, and/or the like). In this regard, one or more rodents may be lured into the extermination chamber 130 due to an aroma of the attractant stored in the attractant station 160.

As shown in FIG. 2, the attractant station 160 may be positioned within the extermination chamber 130 between the third end 142 of Entry Tube 101 and the presence sensor 150. In this way, the attractant station 160 may be configured to entice the rodent 190 to enter the Entry Tube 101 from an external environment via the second end 145 due to the aroma of an attractant stored by the attractant station 160. Prior to the rodent 190 arriving at the attractant station 160, the presence sensor 150 may detect the presence of the rodent within the extermination chamber 130. Although illustrated between the third end 142 and the presence sensor 150, it is to be appreciated that the attractant station 160 may be positioned at any other location in the extermination system, such that an aroma of the attract may still entice rodents outside of the system to enter. In some embodiments, the rodent extermination system may also include additional (e.g., more than one) attractant station 160 so as to provide enhanced enticement for rodents to enter the rodent extermination system.

In some embodiments, the attractant station 160 may also be removable from the rodent extermination system and/or replaceable to allow for replacement of the attractant stored by the attractant station 160 (e.g., in cases where the attractant is a consumable and/or may be depleted through use). For example, the attractant station may comprise a removable component (e.g., a cap, lid, and/or the like). In some embodiments, the attractant station 160 may be transparent to allow a user to visually examine the contents of the attractant station 160 (e.g., to ensure an appropriate fill level or dampness of a sponge or similar absorptive material within the attractant station). Usage of an aroma-based attractant further provides for little to no mess or cleanup compared to conventional methods of using a solid attractant (e.g., peanut butter and/or the like).

For example, in some cases, the attractant station 160 may contain a sponge material that is configured to hold a much higher volume of liquid than a standard sponge. Concentrates, extracts, oils, etc. of cacao, peanut butter, bacon, etc. may be soaked into the sponge. The use of concentrates, extracts and oils is advantageous in that it does not cause an obstruction in the tube, as peanut butter would, nor does it provide a media for bacterial proliferation. These scents travel into the Entry Tube 101 to help entice the rodent to enter the tube.

In some embodiments, the Entry Tube 101 may further comprise at least two electrocution plates 170. As shown and described above, in some embodiments, three electrocution plates 170 may be provided, and one plate may be configured to have a positive charge while the other two plates act as negative grounds. The electrocution plates 170 may be located within the Entry Tube 101 such that the rodent 190 entering the Entry Tube 101 via the second end 145 may be detected by the presence sensor 150 and electrified by the electrocution plates 170. Following electrocution of the rodent 190, a controller 120 (described below) may halt the flow of electrical current to the electrocution plates 170 and may cause the vacuum unit 110 to generate suction. The rodent 190 (which should be dead at this point) may then be moved via suction through the extermination chamber 130 to the first end 140 of the Exit Tube 103. Upon exiting the extermination chamber 130 at the first end 140 of the Exit Tube 103, the rodent may enter a collection container 115 for disposal.

In this regard, an electrocution plate 170 may define a conductive element configured to be electrified (e.g., conduct electrical current) such that, when contacted, the electrocution plate 170 may conduct electrical current to the subject (e.g., the rodent 190) contacting the electrocution plate. In some embodiments, the electrocution plates 170 may be formed of copper material that is configured to be electrified. Although described herein with reference to a copper material, the electrocution plates 170 may be formed of any type of conductive material (e.g., aluminum, copper, etc.). In most embodiments, a conductive material that can be bent to conform to the shape of the tube is preferable.

In order to control operation of the electrocution plates 170, in some embodiments, the electrocution plates 170 may be in electrical communication with (e.g., operably couple to) a controller 120. In such an embodiment, the controller 120 may be configured to cause electrical current to be provided to the electrocution plates 170 so as to electrify the electrocution plate 170 as described above.

As described above, the electrocution plates 170 may be arranged or positioned in a manner suitable to ensure adequate electrocution of the rodent 190 coming into contact with the electrocution plates 170. As such, in some embodiments, such as the embodiment depicted in FIG. 1, the Entry Tube 101 may include a plurality of electrocution plates 170 embedded in the extermination chamber 130. For example, the Entry Tube 101 may include two (2) or more electrocution plates 170. In such an embodiment, the electrocution plates 170 may be electrified (e.g., supplied electrical current) in an alternating fashion. Said differently, the electrocution plates 170 may be configured to be electrified such that some plates are positively charged while other electrocution plates are negatively charged. The electrocution plates 170 may further be arranged to ensure that at least a portion of a rodent 190 comes into contact with the electrocution plates 170. In particular, rodent fur may act as an electrical insulator to protect the rodent from electric shock. As such, the arrangement of the electrocution plates 170 may be configured to ensure that at least a portion of the rodent 190 with little or no fur (e.g., nose, feet, underbelly, tail, etc.) simultaneously contacts electrocution plates 170 of differing electrical charge. The electrocution plates 170 may be of any size and thickness suitable for use with the extermination chamber 130 to ensure rodent contact and electrocution. In some embodiments, the electrocution plates 170 may have a thickness between approximately ±one (1) to two (2) millimeters.

With reference again to FIG. 1, one example of an Acceleration Tube 102 of the extermination chamber 130 is illustrated. The Acceleration Tube 102 may define a fourth end 132 and a fifth end 134 opposite the fourth end 132. The fourth end 132 may be configured to attach or otherwise engage (e.g., be in fluid communication with) the Exit Tube 103 as described hereafter via a junction (e.g., elbow) 135. Similarly, the fifth end 134 may be configured to attach or otherwise engage with (e.g., be in fluid communication with) the Entry Tube 101 via a junction (e.g., elbow) 135. In some embodiments, the Acceleration Tube 102 may be directly attached to the vacuum unit 110 via the fourth end 132 (e.g., in a system 100 without an Exit Tube 103).

With continued reference to FIG. 1, the extermination chamber 130 may further include, in some embodiments, an Exit Tube 103 configured to connect and provide fluid communication between the Acceleration Tube 102 and the vacuum unit 110. As shown, the Exit Tube 103 may be attached or otherwise connected to the vacuum unit 110 via the first end 140 and may similarly be attached or otherwise connected to the Acceleration Tube 102 at the fourth end 132 of the Acceleration Tube 102 (e.g., via a junction 135). The Exit Tube 103 may be configured to direct the rodent 190 exiting the Acceleration Tube 102 to the vacuum unit 110 (e.g., via suction generated by the vacuum unit 110).

Figure 3:
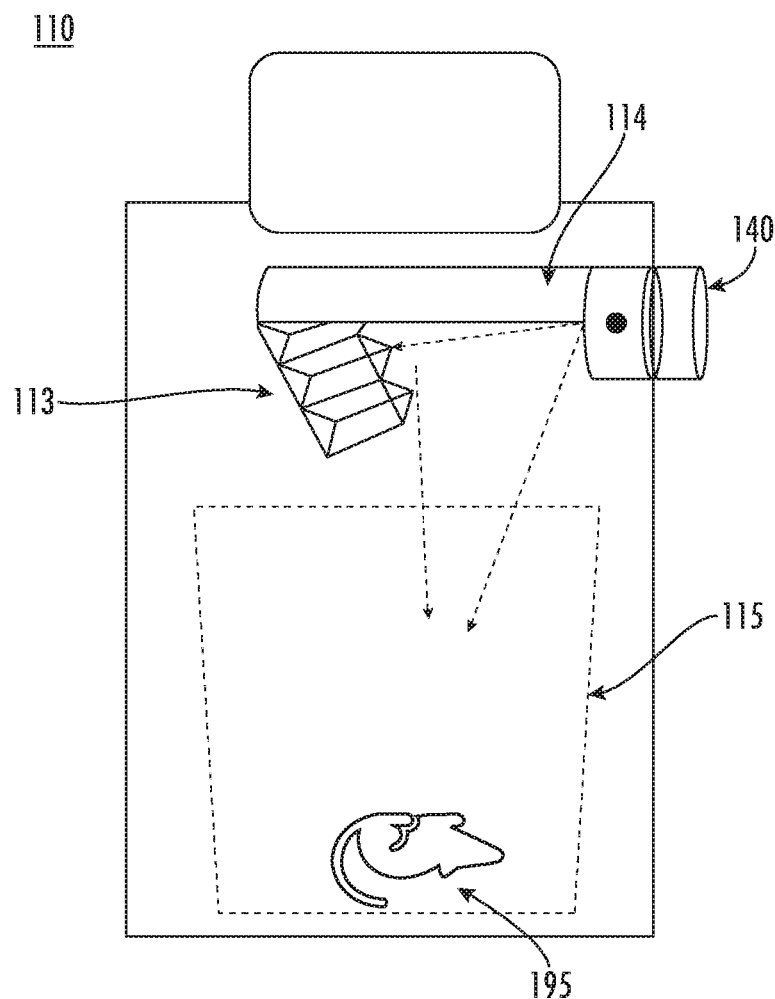
FIG. 3 is a perspective view of a vacuum unit containing a kill plate according to an example embodiment.
Figure 4:
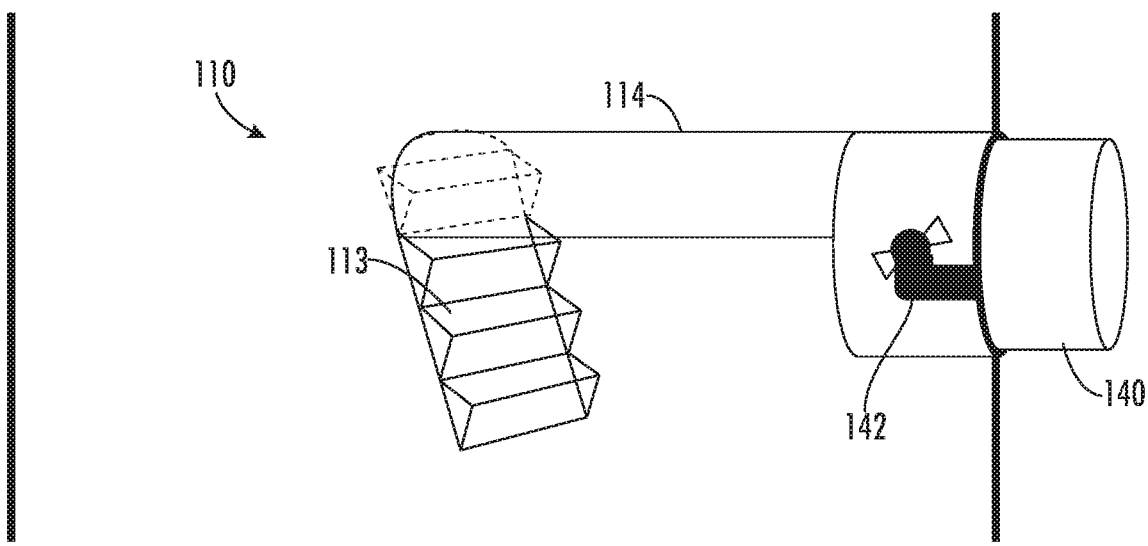
FIG. 4 is a perspective view of a kill plate unit for use with some embodiments described herein.

In some embodiments, upon exiting the extermination chamber 130, the rodent 190 may collide with a kill plate unit 113, as seen in FIGS. 3 and 4 and described further herein, prior to entering the collection container 115. In this regard, collision of the rodent with the kill plate unit 113 may ensure that the rodent has been exterminated prior to entering the collection container 115, in the event that electrocution via the electrocution plates was not sufficient to kill the rodent.

With continued reference to FIG. 1, a vacuum source (e.g., vacuum unit 110) is illustrated for use with some embodiments of the present invention. The vacuum unit 110 may define an opening 112 configured to enable attachment with the extermination chamber 130. For example, the first end 140 of the extermination chamber 130 may attach to the opening 112 such that the vacuum unit 110 and the extermination chamber 130 are in fluid communication. In some embodiments, the opening 112 may be adjustable to provide for attachment of extermination chambers of varying diameters and sizes. For example, the opening 112 may be configured for rodents of a particular size and shape. Furthermore, the opening 112 may be adjustable to allow for connection of an appropriately-sized extermination chamber 130 (e.g., an extermination chamber 130 comprising a diameter configured for a particular size of rodent).

The vacuum unit 112 may be configured to generate suction such that a rodent 190 that enters the extermination chamber 130 via the second end 145 is moved through the extermination chamber 130 from the second end 145 to the first end 140. As would be evident to one of ordinary skill in the art in light of the present disclosure, the vacuum source (e.g., vacuum unit 110) may include any mechanism for generating suction, negative pressure, or the like. Furthermore, in some embodiments, the extermination chamber 130 may be detachable from (e.g., removably attached to) the vacuum unit 110 via the first end 140. Said differently, the extermination chamber 130 as described herein may be produced as a modular component (e.g., an extermination device) that is configured to receive a vacuum source applied thereto.

In some embodiments, the vacuum unit 110 may be in electrical communication with the controller 120. In this regard, the controller 120 may provide electricity to the vacuum unit 120. When electricity is provided to the vacuum unit 110, the vacuum unit may be configured to generate suction applied to the extermination chamber 130. In an instance in which a rodent is present within the extermination chamber 130, the vacuum unit 110 may generate suction (e.g., sufficient force) to move the rodent through the extermination chamber 130 (e.g., from the first end 145 to the second end 140). For example, in some embodiments, the vacuum unit 110 may be configured to generate suction at a volumetric flow of at least 80 to more than 300 cubic feet per minute (CFM) dependent on the flow required by the system size and configuration. In some embodiments, the vacuum unit 110 may be configured to adjust (e.g., increase and/or decrease) the volumetric flow of the suction generated. As would be evident to one of ordinary skill in the art in light of the present disclosure, the volumetric flow of the vacuum source (e.g., vacuum unit 110) may be adjusted based upon the size and shape of the rodent 190 received by the extermination chamber 130. For example, in some embodiments, the vacuum unit 110 may be configured to generate suction at a volumetric flow 300 CFM or more based on the diameter of the extermination chamber 130 and/or the size/type of rodents in an infestation.

In some embodiments, as seen in FIGS. 3 and 4, the vacuum unit 110 may further include a kill plate unit 113. The kill plate unit 113 may be positioned within the vacuum unit 110 such that during suction of a rodent through the extermination chamber 130, the rodent may be directed into contact with (e.g., forced to collide with) the kill plate unit with sufficient force to induce cervical dislocation and/or blunt force trauma to the rodent. In this way, as noted above, the kill plate unit 113 may serve as a secondary or alternative means of extermination. In some embodiments, the kill plate unit 113 may be formed of hard plastics or metal (e.g., steel, angle iron, aluminum and/or the like). The kill plate unit 113 may be dimensioned (e.g., sized and shaped) to accommodate rodents of any size, primarily dependent upon the size of the tubing being employed in the system.

In one embodiment, the kill plate unit 113 may be a modular component configured to attach and detach from the extermination system. For example, as illustrated in FIG. 4, the kill plate unit 113 may be positioned within the vacuum unit 110 and configured to attach to the first end of the extermination chamber 130, e.g., via a removable kill plate unit frame. In this regard, the modular kill plate unit 113 may be easily detachable or otherwise removable to allow for replacement of a collection container 115, removal of one or more electrocuted rodents 195, cleaning of the vacuum unit 110 and/or kill plate unit 113, and/or the like. In some embodiments, the kill plate unit 113 may comprise a locking mechanism 142 to provide secure attachment to the extermination chamber 130.

In some embodiments, as noted above, the vacuum unit 110 may further include a collection container 115. The collection container 115 may be configured to store a plurality of exterminated rodents 195 (e.g., rodents 190 following electrocution in the extermination chamber 130 and, in some embodiments, impact with the kill plate unit 113). In this regard, the rodent extermination system may be used to eliminate a large number of rodents without any human intervention. In some embodiments, the collection container 115 may be removable from the vacuum unit 110 and replaceable. In some embodiments, the collection container 115 may be a receptacle that comprises a bag or equivalent liner such that the exterminated rodents are collected within the bag upon exiting the extermination chamber 130, and, in some embodiments, following collision with the kill plate unit 113. In this regard, the rodent extermination system may provide for sanitary removal and replacement of the bag and/or collection container 115 to reduce or prevent human contact with the exterminated rodents 195. In some embodiments, the collection container may be a five (5) gallon collection receptacle. In another embodiment, the collection container may be a twenty (20) gallon collection receptacle. The present disclosure contemplates that the collection container 115 may be of any size suitable for the intended application. Also, in place of a physical collection container, polypropylene or heavy millage plastic bags may be hung in the collection container, negating the need for a collection receptacle as the bags become the receptacle.

During operation, a rodent 190 may enter the extermination chamber 130 (e.g., from an external environment) via a second end 145. In some embodiments, the rodent may be caused to enter the extermination chamber 130 via lure of a rodent attractant stored in an attractant station 160. A presence sensor 150 may detect the rodent 190 within the extermination chamber 130. In an instance in which the presence sensor detects the rodent 190, the electrocution plates 170 may be electrified for a first time period and the rodent may be electrocuted via contact with the electrocution plates 170. Additionally, the vacuum unit 110 may generate suction for a second time period as described hereafter. The electrocuted rodent may then be moved via suction through the extermination chamber to the first end 140. Upon exiting the extermination chamber 130 at the first end 140, the rodent may enter (e.g., fall into) the collection container 115 for disposal. In some embodiments, upon exiting the extermination chamber 130, the rodent 190 may collide with a kill plate unit 113 prior to being deposited the collection container 115. In this regard, collision of the rodent with the kill plate unit 113 may ensure the rodent has been eliminated prior to entering the collection container 115.

In some embodiments, the vacuum unit 110 may include an indicator (not shown) in electrical communication with the controller 120. In some embodiments, the indicator may comprise a motion sensor, pressure sensor, contact switch, and/or the like. Regardless of the type of sensor, the indicator may be configured to detect a presence of a rodent 190 exiting the Acceleration Tube 102 and/or entering the vacuum unit 110 via the extermination chamber 130. extermination system. In some embodiments, the indicator (not shown) may cause an external indication to a user that the vacuum unit 110 (e.g., the collection container 115) houses the rodent 195. For example, the indicator (not shown) may be connected to an external device (e.g., a light, siren, screen, or the like) outside of the vacuum unit 110 that may indicate to the user that the system 100 has exterminated the rodent 190 and that the exterminated rodent 195 is presently located within the vacuum unit 110. In other cases, the indicator may comprise or include a counter that counts the number of rodents that have exited the Acceleration Tube 102 via the Exit Tube 103 and/or have entered the vacuum unit 110 (e.g., have been deposited in the collection container 115). In such embodiments, the indicator may be configured to alert the user once a threshold number of rodents has been exterminated, signaling to the user that the collection container 115 should be emptied to allow additional rodents to be exterminated and collected. In this way, the user need not empty the collection container 115 each time a single rodent is exterminated but can wait until the threshold has been reached.

In some cases, for example, the collection container 115 may be a 20-gallon container (e.g., where a 3-inch tube system is used) with an estimated capacity of 15 to 30 rodents. In other cases, the collection container 115 may be a 16-gallon container (e.g., where a 2.5-inch tube system is used) with an estimated capacity of 10 to 20 rodents. In still other cases, the collection container 115 may be an 8-gallon container (e.g., where a 2-inch tube system is used) with an estimated capacity of 8 to 12 rodents.

As noted above, a bag or liner may be used within the collection container 115. The bag may be a woven polypropylene bag, a polyethylene bag, a paper bags, a surplus bag, or any bag of a size that will fit into the collection container 115 or can be cut to fit the container.

The collection container 115 may be made from stainless steel, or as in the case of the commercial unit, may be made from heavy duty steel that has been coated with a corrosion resistant paint. As such, the collection container 115 may be resistant to corrosion and may thus be easily cleaned. Moreover, in some embodiments, the air entering the vacuum unit 110 may be filtered to cut down on the possibility of spreading airborne pathogens through the exhaust system when in operation.

Figure 5A:
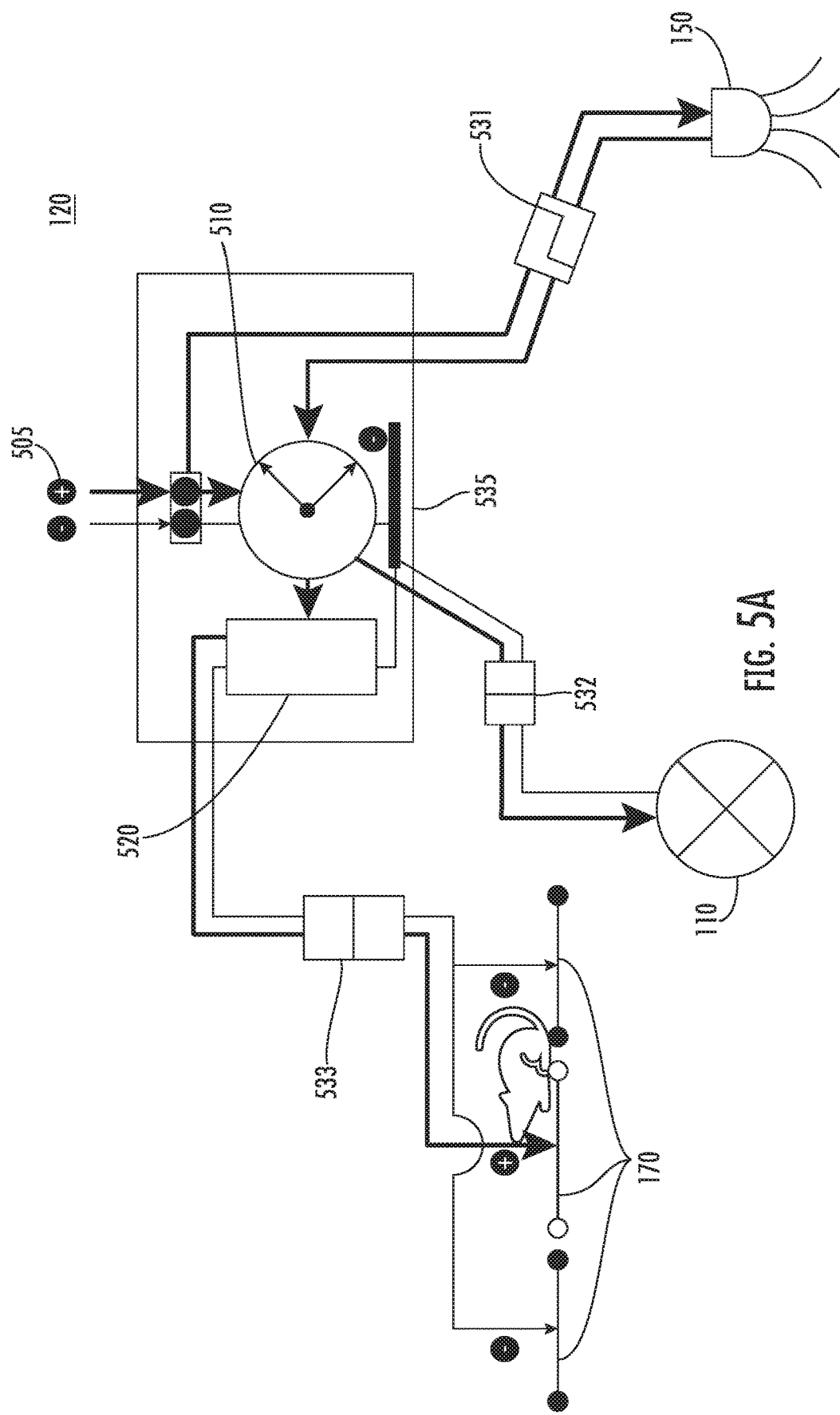
FIG. 5A is a perspective view of a controller for use with some embodiments described herein.

With reference to FIG. 5A, a controller, herein referred to as an Electronic Control Box (ECB) 120 is illustrated for use with some embodiments of the present invention. In any embodiment, the ECB 120 or separate computing elements may be configured to cause electrical current supplied via an external source 505 (e.g., an electrical outlet) to be supplied to the components of the extermination chamber 130. For example, the ECB 120 or extermination chamber 130 may receive a 110-volt alternating current (AC) (e.g., via a Ground Fault Interrupt (GFI) plug and/or the like). The GFI circuitry may alternatively be included in the ECB. In some embodiments, the ECB 120 or extermination chamber 130 may receive an AC at a different voltage, such as a 110-volt AC or 220-volt AC. The present disclosure contemplates receiving an AC of any voltage suitable to power the components of the rodent extermination system. The ECB 120 may be configured to direct electrical current (e.g., provide power) to the at least one presence sensor 150, the electrocution plates 170, and/or the vacuum unit 110 of the rodent extermination system.

In some embodiments, the ECB 120 may also include an adjustable on/off timer 510 (e.g., with an initial interval possibly being set between 0.50 to 2 seconds) to control operation of one or more components of the extermination chamber 130 for periods of time. In some embodiments, the at least one presence sensor 150 of the rodent extermination system may be configured to activate the timer 510. By way of example, in an instance in which the at least one presence sensor 150 detects a rodent 190 within the extermination chamber 130, the timer 510 may cause the electrocution plates 170 to be electrified (e.g., supply electrical current to) for a first time period (as an example, for 0.50 to 2 seconds) and/or may cause the vacuum unit to generate suction (e.g., supply electrical current to the vacuum unit) for a second time period. The timer 510 may then be configured to break the circuit. For example, the ECB 120 may provide 110-volt AC to the vacuum unit 110 for the second time period in order to power the vacuum unit 110 to generate suction. Said differently, electrical current may only flow to the vacuum unit 110 during the second time period. Similarly, the controller may provide (for example) 7000-volt DC to the a positively charged electrocution plate 170 during activation of the timer 510 for the first time period. Upon deactivation of the timer 510 (e.g., after the first and/or second periods of time have elapsed), the ECB 120 may halt flow of electrical current to the vacuum unit 110 and/or the electrocution plates 170. For example, the time period during which electricity is provided to the electrocution plates 170 may be shorter than the time period during which the vacuum unit 110 is activated to generate suction in order to conserve power consumption and to ensure sufficient time for the vacuum unit 110 to deliver the rodent 190 though the extermination chamber 130 and into the collection container 115. As shown in FIG. 5A, the ECB 120 may additionally comprise a plurality of connectors. The size and amperage of the plurality of connectors may be dependent of the wire size and/or gauge (AWG) requirements of the individual components of the system. The use of these connectors may ensure that the ECB can be separated from the other system components if there is a need from repair or replacement of the unit.

In one embodiment, the ECB 120 may operate on a standard 110-volt AC circuit that has passed through a GFI (ground fault interrupt) plug. The ECB may convert a 110-volt AC current to a ±7000-volt DC current that is provided to the electrocution plates after the sensor signal reaches the ECB informing it that a rodent has triggered the sensor signal. After a fraction of a second delay or longer, for example, the ECB 120 may turn on the vacuum system to pull the electrocuted rodent through the Acceleration Tube 102 and crashes it into the kill plate unit 113 in the Exit Tube 103 at approximately 25 to 35 feet per second. The vacuum system 110 may run for 2 to 3 seconds before turning off and resetting for the next rodent entry.

In some embodiments, the ECB 120 may further include a converter 520. The ECB 120 may be configured to provide electrical current to the converter 520 for conversion from alternating current (AC) to direct current (DC). For example, 110-volt AC may be directed to the converter 520 by the ECB 120. The converter 520 may be configured to convert the 110-volt AC into a ±7000-volt direct current (DC). The ECB 120 may then direct the ±7000-volt DC from the converter 520 to at least two electrocution plates 170 of the rodent extermination system. In some embodiments, the ECB 120 may further comprise ground fault interrupt (GFI) circuitry configured to prevent electrocution (e.g., a shock) to a non-targeted animal or person in the event of unintentional grounding.

Although described herein with reference to an ECB 120 configured to at least partially control operation of the rodent extermination system, the present disclosure contemplates that in some embodiments, the extermination chamber 130 may not rely upon a controller (e.g., ECB 120). Said differently, in some embodiments, one or more of the components (e.g., presence sensor 150, electrocution plates 170, etc.) of the extermination chamber 130 may include one or more computing elements configured to control operation of the respective components.

Figure 5B:
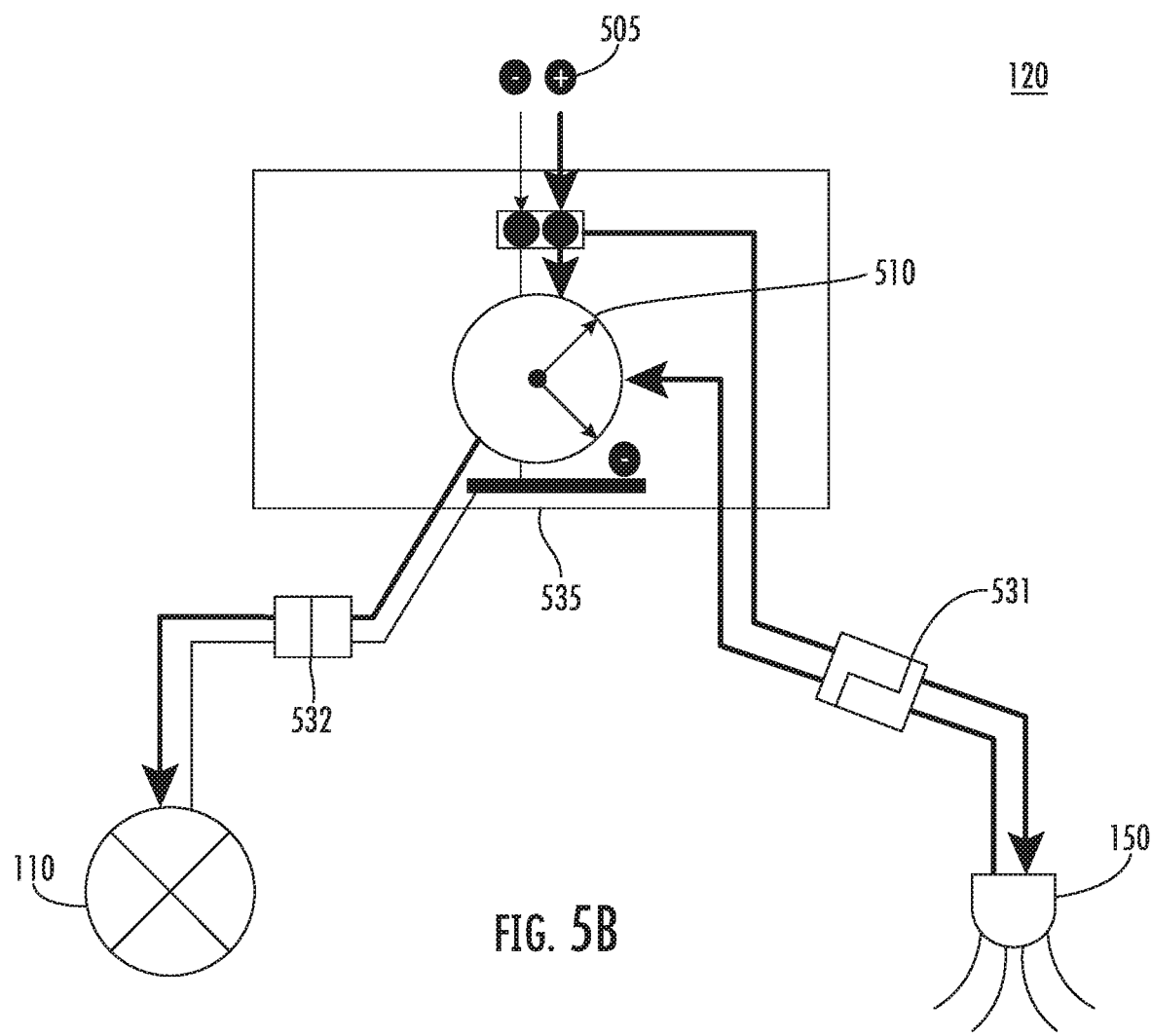
FIG. 5B is a perspective view of a controller for use with some embodiments described herein.

FIG. 5B shows an alternate embodiment of the ECB 120 (e.g., a partial ECB) in which the converter 520 is not present. In this regard, the partial ECB illustrated in FIG. 5B may be utilized in an embodiment in which the rodent extermination system does not comprise electrocution plates or any method of electrocution. Said differently, the rodent extermination system of said embodiment may use acceleration and blunt force trauma and/or cervical dislocation of a rodent (e.g., via collision with a kill plate unit 113) as the sole method of execution, without any means of electrocution.

In some embodiments, the controller 120 may comprise processing circuitry (e.g., a processor), memory, and/or other associated circuitry. The processing circuitry may be in communication with the memory device via a bus for passing information among components of the apparatus. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally, or alternatively, the memory device could be configured to store instructions for execution by the processing circuitry.

The processing circuitry may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally, or alternatively, the processing circuitry may include one or more processors configured in tandem via the bus to enable independent execution of instructions, pipelining and/or multithreading.

In an example embodiment, the processing circuitry may be configured to execute instructions stored in the memory device or otherwise accessible to the processing circuitry. Alternatively, or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU), and logic gates configured to support operation of the processing circuitry.

Example Method of Manufacturing

Figure 6:
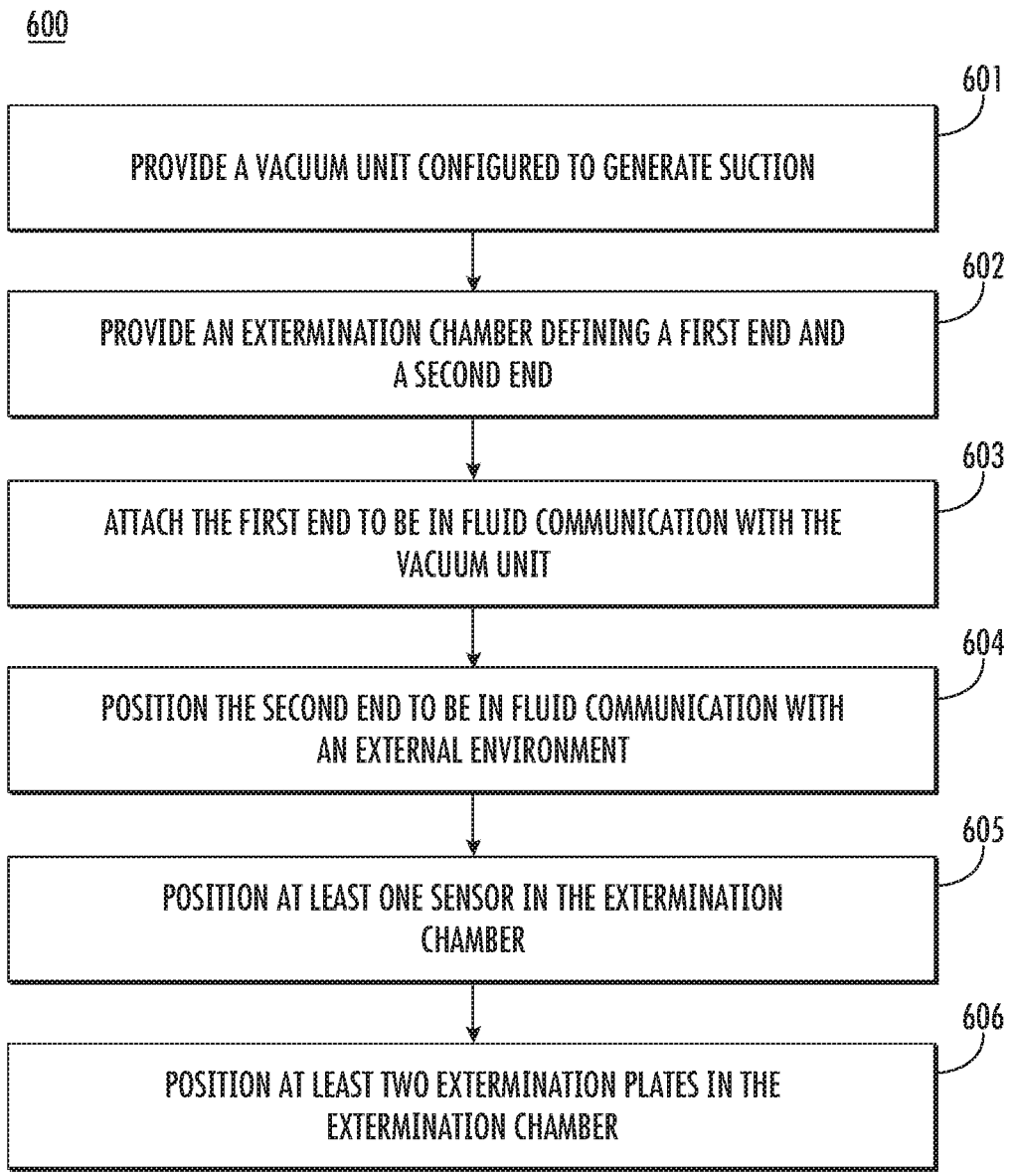
FIG. 6 is a flowchart illustrating example steps for a method of manufacturing a rodent extermination system in accordance with some embodiments described herein.

With reference to FIG. 6, a method of manufacturing a rodent extermination system according to embodiments of the invention is illustrated. The steps described below and with reference to FIG. 6 may be performed in any order suitable for accomplishing the purpose and function of the extermination system described above, and in some cases the steps may be carried out simultaneously or nearly simultaneously.

The method (e.g., method 600) may include the step of providing a vacuum unit configured to generate suction at Block 601. As described above, the vacuum unit may define an opening configured to enable attachment of the extermination chamber such that the vacuum unit and the extermination chamber are in fluid communication with each other. In some embodiments, the opening may be adjustable to provide for attachment of extermination chambers of varying diameters and sizes. As described above, the opening may be configured for rodents of a particular size and shape and may be adjustable to allow for connection of an appropriately-sized extermination chamber. The vacuum unit may be configured to generate suction at a predetermined velocity dependent of the requirements for the systems size and configuration. This velocity will normally be greater than 80 CFM and may exceed 300 CFM. In some embodiments, the vacuum unit may be configured to adjust the velocity of the suction generated. As described above, the vacuum source (e.g., vacuum unit) may include any mechanism for generating suction, negative pressure, or the like.

The method 600 may also include providing an extermination chamber defining a first end and a second end at Block 602. As described above, the extermination chamber may be in the form of a tube (e.g., a hollow cylindrical tube) extending between the first end and the second end and composed of a synthetic plastic polymer (e.g., PVC piping). In some embodiments, the extermination chamber may comprise a diameter of at least two (2) inches.

The method 600 may also include attaching the first end of the extermination chamber to be in fluid communication with the vacuum unit in Block 603. As described above, the first end of the extermination chamber may be configured to attach to a vacuum unit (e.g., the opening of the vacuum unit). For example, a first end of the extermination chamber may attach to the opening such that the vacuum unit and the extermination chamber are in fluid communication. In some embodiments, the opening may be configured to be adjustable to provide for attachment of extermination chambers of varying diameters and sizes.

The method 600 may also include disposing the second end of the extermination chamber to be in fluid communication with an external environment at Block 604. As described above, the second end of the extermination chamber may be disposed to be in fluid communication with an external environment (e.g., an environment outside of the rodent extermination device), allowing the second end to serve as an entrance into the extermination chamber for a rodent. As described above, the present disclosure contemplates that the external environment may refer to any position located outside of the extermination chamber. For example, the second end may be positioned within a housing or other enclosure (e.g., for aesthetic purposes) such that the external environment of the extermination chamber refers a position within such enclosure.

The method 600 may also include disposing at least one sensor in the extermination chamber at Block 605. As described above, the at least one sensor may be configured to detect a presence of a rodent within the extermination chamber. For example, the sensor may be a motion sensor, pressure sensor, contact switch, and/or the like. In some embodiments, the at least one sensor may be positioned outside of the extermination chamber but may be configured to detect the presence of a rodent within the extermination chamber (e.g., via infrared light rays and/or the like). In certain embodiments, the at least one sensor may be disposed between the second end of the extermination chamber and the electrocution plates and/or an attractant station.

The method 600 may also include disposing at least two electrocution plates (e.g., three electrocution plates) in the extermination chamber at Block 606. As described above, the electrocution plates may be embedded into the extermination chamber. The electrocution plates may be composed of copper, aluminum, and/or any other type of conductive metal. The electrocution plates may be sized, for example, based on the size of the tubing (e.g., the extermination chamber) employed in a particular rodent control system as well as the size of the target rodent(s). Width of the electrocution plates may be one-third (⅓) of an inner circumference of the tubing (e.g., the extermination chamber). In some embodiments, the length and placement of the electrocution plates 170 may be based on the size of the tubing, ergo the size of the rodent(s). The initial entry plate located closest to the second end 145 may be a negatively charged plate. The second plate may be positively charged and at least partially located under the sensor 150 within the entry tube 101. The third plate may be a negatively charged plate that may be located at least partially under the attractant station (e.g., as illustrated in FIG. 2). The length of each plate and respective location may be based on the physical size of the rodent that enters the system. For example, some large rats may be nine (9) to twelve (12) inches long; whereas mice may be as small as two (2) to three (3) inches long. The size, location and separation of the plates varies accordingly. As described above, the at least two electrocution plates may be disposed at any position within the extermination chamber so long as sufficient physical contact with a rodent is provided. The electrocution plates may define a conductive element configured to be electrified (e.g., conduct electrical current) such that, when contacted, the electrocution plates may conduct electrical current to the subject (e.g., rodent) contacting the electrocution plate.

In some embodiments, the method 600 may further include disposing an attractant station in the extermination chamber. The attractant station may be disposed within the extermination chamber with the electrocution plates and the at least one sensor. As described above, the attractant station may be removable and replaceable to allow for refilling of the attractant station with new attractant when necessary. As described above, the attractant station may be configured to entice the rodent to enter the extermination section from an external environment via the second end under the lure of an attractant stored by the attractant station. In some embodiments, the attractant station may be transparent to allow a user to visually examine the contents of the attractant station (e.g., to ensure an appropriate fill level or dampness of a sponge within the attractant station).

In some embodiments, the method 600 may further include disposing a collection container in the vacuum unit. As described above, the collection container may be configured to store at least one exterminated rodent upon its exit from the extermination chamber via the first end (e.g., due to suction) and, in some embodiments, after colliding with a kill plate unit. As described above, in some embodiments, the collection container may include a five (5) gallon collection receptacle. In another embodiment, the collection container may include a twenty (20) gallon collection receptacle. The present disclosure contemplates the collection container may be of any size suitable for the intended application to store a plurality of exterminated rodents. As previously noted, polypropylene, plastic, and/or other bags may serve as the collection receptacle.

In some embodiments, the method 600 may further include configuring a controller to be in electrical communication with the vacuum unit, the at least one sensor, and the at least two electrocution plates and configuring the controller to activate a timer for a predefined time interval in an instance in which the at least one sensor detects a rodent within the extermination chamber. As described above, the controller may be configured to cause electrical current supplied via an external source (e.g., an electrical outlet) to be supplied to the components of the extermination chamber. For example, the controller 120 or extermination chamber may receive alternating current (AC). The controller may be configured to direct electrical current (i.e., provide power) to the at least one sensor, the electrocution plates, and/or the vacuum unit of the rodent extermination system. As described above, the controller may also include a timer to control operation of one or more components of the extermination chamber for periods of time. In some embodiments, the at least one sensor of the rodent extermination system may be configured to cause activation of the timer. As described above, by way of example, in an instance in which the at least one sensor detects a rodent within the extermination chamber, the timer may cause the electrocution plates to be electrified (e.g., supplied with electrical current) for a first time period and/or may cause the vacuum unit to generate suction (e.g., via supply of electrical current) for a second time period. As described above, in some embodiments, the controller may further include a converter. The controller may be configured to provide electrical current to the converter for conversion from alternating current (AC) to direct current (DC).

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A rodent extermination system, the system comprising:
   an extermination chamber defining:
   a first end;
   a second end in fluid communication with an external environment;
   at least one presence sensor positioned in the extermination chamber and configured to detect a rodent within the extermination chamber; and
   at least two electrocution plates positioned in the extermination chamber; and
   a vacuum unit attached to and in fluid communication with the first end of the extermination chamber, wherein in an instance in which the at least one presence sensor detects the rodent within the extermination chamber:
    the at least two electrocution plates are electrified; and
    the vacuum unit generates suction such that the rodent is moved through the extermination chamber from the second end to the first end,
wherein the rodent is electrocuted via contact with the at least two electrocution plates,
wherein the vacuum unit comprises a kill plate unit positioned within the vacuum unit and configured such that the rodent exiting the extermination chamber at the first end collides with the kill plate unit within the vacuum unit.

2. The rodent extermination system according to claim 1, wherein the extermination chamber further comprises an attractant station configured to store a rodent attractant.

3. The rodent extermination system according to claim 1, wherein the vacuum unit comprises a collection container configured to receive the rodent exiting the extermination chamber at the first end.

4. The rodent extermination system according to claim 1, wherein, in an instance in which the at least one presence sensor detects the rodent within the extermination chamber, the at least two electrocution plates are electrified for a first time period and the vacuum unit generates suction for a second time period.

5. The rodent extermination system according to claim 2, wherein the at least one presence sensor is positioned between the attractant station and the second end.

6. A rodent extermination device, the device comprising:
    an extermination chamber defining:
        a first end configured to receive a vacuum source connected thereto;
        a second end in fluid communication with an external environment;
        at least one presence sensor positioned in the extermination chamber and configured to detect a rodent within the extermination chamber;
        at least two electrocution plates positioned in the extermination chamber;
    wherein, in an instance in which the at least one sensor detects the rodent within the extermination chamber, the at least two electrocution plates are electrified such that the rodent is electrocuted via contact with the at least two electrocution plates and, via application of suction at the first end, the rodent is moved through the extermination chamber from the second end to the first end,
    wherein the vacuum source comprises a kill plate unit positioned within the vacuum source and configured such that the rodent exiting the extermination chamber at the first end collides with the kill plate unit within the vacuum source.

7. The rodent extermination device according to claim 6, wherein, in an instance in which the at least one presence sensor detects the rodent within the extermination chamber, the at least two electrocution plates are electrified for a first time period.

8. The rodent extermination device according to claim 6, wherein the extermination chamber further defines an attractant station configured to store a rodent attractant.

9. The rodent extermination device according to claim 8, wherein the at least one presence sensor is positioned between the attractant station and the second end.

10. The rodent extermination device according to claim 6, wherein the extermination chamber is configured to be removably attached to a vacuum unit via the first end.

11. A method of manufacturing a rodent extermination system, the method comprising:
    providing an extermination chamber, wherein the extermination chamber defines:
        a first end; and
        a second end in fluid communication with an external environment;
    positioning at least one presence sensor in the extermination chamber, wherein the at least one presence sensor is configured to detect a rodent within the extermination chamber;
    positioning at least two electrocution plates in the extermination chamber; and
    providing a vacuum unit attached to and in fluid communication with the first end of the extermination chamber,
    wherein in an instance in which the at least one presence sensor detects the rodent within the extermination chamber:
        the at least two electrocution plates are electrified; and
        the vacuum unit generates suction such that the rodent is moved through the extermination chamber from the second end to the first end,
    wherein the rodent is electrocuted via contact with the at least two electrocution plates,
    wherein the vacuum unit comprises a kill plate unit positioned within the vacuum unit and configured such that the rodent exiting the extermination chamber at the first end collides with the kill plate unit within the vacuum unit.

12. The method of manufacturing according to claim 11, further comprising providing a collection container configured to receive the rodent exiting the extermination chamber at the first end.

13. The method of manufacturing according to claim 11, further comprising providing an attractant station in the extermination chamber configured to store a rodent attractant.

14. The method of manufacturing according to claim 11, wherein, in an instance in which the at least one presence sensor detects the rodent within the extermination chamber, the at least two electrocution plates are electrified for a first time period and the vacuum unit generates suction for a second time period.

15. The method of manufacturing according to claim 13, wherein the at least one presence sensor is positioned between the attractant station and the second end.

16. The method of manufacturing according to claim 11, wherein the extermination chamber is removably attached to the vacuum unit via the first end.

17. The method of manufacturing according to claim 11, further comprising positioning a kill plate unit configured such that the rodent collides with the kill plate unit exiting the extermination chamber at the first end.

18. The rodent extermination system according to claim 1, wherein, prior to detection of the rodent by the at least one presence sensor, the at least two electrocution plates are inactive.

19. The method of manufacturing according to claim 11, wherein, prior to detection of the rodent by the at least one presence sensor, the at least two electrocution plates are inactive.

20. The rodent extermination device according to claim 6, wherein, prior to detection of the rodent by the at least one presence sensor, the at least two electrocution plates are inactive.

\* \* \* \* \*